(12) United States Patent
Rizzo et al.

(10) Patent No.: US 7,308,249 B2
(45) Date of Patent: Dec. 11, 2007

(54) COMMUNICATION BETWEEN ELECTROMAGNETIC TRANSPONDERS

(75) Inventors: Pierre Rizzo, Aix en Provence (FR); Jérôme Conraux, Trets (FR)

(73) Assignee: STMicroelectronics S.A., Montrouge (FR)

( * ) Notice: Subject to any disclaimer, the term of this patent is extended or adjusted under 35 U.S.C. 154(b) by 481 days.

(21) Appl. No.: 10/712,325

(22) Filed: Nov. 12, 2003

(65) Prior Publication Data

US 2004/0104809 A1    Jun. 3, 2004

(30) Foreign Application Priority Data

Nov. 13, 2002   (FR)   .................................. 02 14201

(51) Int. Cl.
*H04M 1/66* (2006.01)
*H04Q 5/22* (2006.01)
*G08B 29/00* (2006.01)

(52) U.S. Cl. .................... 455/411; 340/10.1; 340/506; 455/456.1

(58) Field of Classification Search .................. 455/411, 455/101, 41.1, 21, 17, 456.1; 340/10.3, 10.4, 340/10.1, 572.1, 506, 10.34, 10; 342/118, 342/42

See application file for complete search history.

(56) References Cited

U.S. PATENT DOCUMENTS

| | | | |
|---|---|---|---|
| 5,347,280 A | | 9/1994 | Schuermann |
| 5,434,572 A | | 7/1995 | Smith ........................... 342/44 |
| 5,517,194 A | * | 5/1996 | Carroll et al. ........... 340/10.34 |
| 5,541,604 A | * | 7/1996 | Meier ........................... 342/42 |
| 5,550,536 A | * | 8/1996 | Flaxl ........................... 340/10.3 |
| 5,703,573 A | * | 12/1997 | Fujimoto et al. ........... 340/10.3 |
| 6,456,668 B1 | * | 9/2002 | MacLellan et al. ......... 375/283 |
| 6,473,028 B1 | * | 10/2002 | Luc ............................. 342/118 |
| 6,531,957 B1 | | 3/2003 | Nysen |
| 6,538,564 B1 | * | 3/2003 | Cole ........................... 340/10.4 |
| 6,867,687 B2 | | 3/2005 | Turner |
| 6,868,073 B1 | | 3/2005 | Carrender |
| 6,920,330 B2 | * | 7/2005 | Caronni et al. ........... 455/456.1 |
| 6,943,680 B2 | * | 9/2005 | Ward, Jr. .................... 340/506 |
| 2002/0105376 A1 | | 8/2002 | Bardouillet et al. ........ 329/358 |

FOREIGN PATENT DOCUMENTS

EP    1 136 940    9/2001

OTHER PUBLICATIONS

"Part 2: Radio Frequency Power and Signal Interface," *ISO/IEC FCD 15693-2/* Identification Cards—Contactless Integrated Circuit(s) Cards—Vicinity Cards, Mar. 9, 1999, pp. 1-16.
"Part 2: Radio Frequency Power and Signal Interface," *Final Committee Draft ISO/IEC 14443-2/* Identification Cards—Contactless Integrated Circuit(s) Cards—Vicinity Cards, Mar. 26, 1999, pp. 1-16.

* cited by examiner

*Primary Examiner*—Joseph Feild
*Assistant Examiner*—Kiet Doan
(74) *Attorney, Agent, or Firm*—Lisa K. Jorgenson; Dennis M. de Guzman; Seed IP Law Group PLLC

(57) ABSTRACT

An electromagnetic transponder intended to draw the power necessary to its operation of from a field radiated by a terminal of transmission of a carrier at a first supply frequency and to back-modulate the received signal at the rate of a sub-carrier at a second frequency lower than the first one, and comprising means capable of demodulating and decoding signals modulated by said sub-carrier, as well as a system of communication between such transponders.

13 Claims, 3 Drawing Sheets

COMMUNICATION BETWEEN ELECTROMAGNETIC TRANSPONDERS

BACKGROUND OF THE INVENTION

1. Field of the Invention

The present invention relates to systems using electromagnetic transponders, that is, transmitters and/or receivers (generally mobile) likely to be interrogated contactless and wireless by a unit (generally fixed), called a read and/or write terminal. The present invention more specifically relates to transponders with no autonomous power supply, for example of contactless card or electronic tag type. These transponders extract the power supply required by the electronic circuits included therein from the high-frequency field radiated by an antenna of the read/write terminal. The present invention applies to such transponders, be they read-only transponders, that is, capable of operating with a terminal only reading the transponder data, or read/write transponders which contain data that can be modified by the terminal.

2. Discussion of the Related Art

FIG. 1 very schematically and functionally shows a conventional example of data exchange between a read/write terminal 1 (STA) and a transponder 10 (CAR).

Terminal 1 is essentially formed of an oscillating circuit formed of an inductance L1, in series with a capacitor C1 and a resistor R1, between an output terminal 2p of an amplifier or antenna coupler 3 and a terminal 2m at a reference voltage (generally the ground). Amplifier 3 receives a high-frequency transmission signal Tx, originating from a modulator 4 (MOD). The modulator receives a reference frequency, for example from a quartz oscillator 5 and, if need be, a signal DATA of data to be transmitted. In the absence of any data transmission from terminal 1 to transponder 10, signal Tx is only used as a power source to activate transponder 10 if said transponder enters the field. The data to be transmitted generally originate from a digital system, for example, a microprocessor 6 (μP).

The connection point of capacitor C1 with inductance L1 forms, in the example shown in FIG. 1, a terminal of sampling of a data signal Rx received from a transponder 10, intended for a demodulator (DEM). An output of the demodulator communicates (possibly via a decoder 8 (DEC)) the data received from transponder 10 to microprocessor 6 of terminal 1. Demodulator 7 generally receives from oscillator 5 a clock or reference signal for a phase demodulation. The demodulation may be performed from a signal sampled between capacitor C1 and resistor R1, and not across inductance L1. Microprocessor 6 communicates (BUS) with different input/output circuits (keyboard, screen, means of exchange with a server, etc.) and/or processing circuits. The circuits of the read/write terminal draw the power necessary to their operation from a supply circuit 9 (ALIM) connected, for example, to the electric supply system.

On the side of transponder 10, an inductance L2, in parallel with a capacitor C2, forms a parallel oscillating circuit (called a resonant receive circuit) intended to sense the magnetic field generated by series oscillating circuit L1, C1 of terminal 1. The resonant circuit (L2, C2) of transponder 10 is tuned on the resonance frequency of the oscillating circuit of terminal 1.

Terminals 11 and 12 of resonant circuit L2, C2 which correspond to the terminals of capacitor C2 are connected to two A.C. input terminals of a rectifying bridge 13 having their rectified output terminals 14 and 15 connected across a capacitor Ca of power storage and smoothing of the rectified voltage provided by bridge 13. Bridge 13 is a halfwave or fullwave bridge.

When transponder 10 is in the field of terminal 1, a high-frequency voltage is generated across resonant circuit L2, C2. This voltage rectified by bridge 13 is smoothed by capacitor Ca, which provides a supply voltage to electronic circuits of the transponder via a voltage regulator 16 (REG). These circuits generally comprise, essentially, a microprocessor 17 (μP) associated with a memory not shown, a demodulator 18 (DEM) of the signals possibly received from terminal 1, and a modulator 19 (MOD) for transmitting information to terminal 1. The transponder is generally synchronized by means of a clock (CLK) extracted by a block 20 from the high-frequency signal recovered across capacitor C2 before rectification. Most often, all the electronic circuits of transponder 10 are integrated in a same chip.

To transmit data from transponder 10 to terminal 1, modulator 19 controls a stage of modulation (back modulation) of resonant circuit L2, C2. This modulation stage is generally formed of an electronic switch (for example, a transistor T) and of a resistor R, in series between terminals 14 and 15.

Transistor T is controlled at a so-called sub-carrier frequency (for example, 847.5 kHz), much smaller (generally with a ratio of at least 10) than the frequency of the excitation signal of the oscillating circuit of terminal 1 (for example, 13.56 MHz). When switch T is on, the transponder's oscillating circuit is submitted to an additional damping with respect to the load formed by circuits 16 to 20, so that the transponder draws a more significant amount of power from the high-frequency magnetic field. On the side of terminal 1, amplifier 3 maintains the amplitude of the high-frequency excitation signal constant. Accordingly, the power variation of the transponder translates as an amplitude and current phase variation in antenna L1. This variation is detected by demodulator 7 of the terminal which is either a phase demodulator, or an amplitude demodulator.

In certain cases, the back-modulation stage (transistor T, resistor R) is located upstream of bridge 13, that is, on the side of its A.C. inputs.

The terminal generally does not transmit data while it receives some from the transponder, the transmission occurring alternately in one direction, then in the other.

FIG. 2 illustrates a conventional example of a data transmission from terminal 1 to a transponder 10. This drawing shows an example of the shape of the excitation signal of antenna L1 for a transmission of a code 0101. The modulation currently used is an amplitude modulation with a 106-kilobits-per-second rate (1 bit is transmitted in approximately 9.5 microseconds) much smaller than the frequency (for example, 13.56 MHz) of the carrier originating from oscillator 5 (period of approximately 74 nanoseconds). The amplitude modulation is performed either in all or nothing or with a modulation rate (defined as being the difference of peaks amplitudes (a, b) between the two states (0 and 1) divided by the sum of these amplitudes) smaller than one, due to the need for supply of transponder 10. In the example of FIG. 2, the carrier at 13.56 MHz is modulated, with a rate of 106 kilobits per second, in amplitude with a modulation ratio tm of, for example, 10%.

FIG. 3 illustrates a conventional example of a data transmission from transponder 10 to terminal 1. This drawing illustrates an example of the shape of signal $V_T$ of control of transistor T, provided by modulator 19, and of the corresponding signal Rx received by terminal 1. On the transponder side, the back modulation is generally of resistive type with a carrier, called a sub-carrier of, for example, 847.5 kHz (period of approximately 1.18 ms). The back modulation is, for example, based on a BPSK-type coding (binary phase shift keying) with a rate on the order of 106 kilobits per second much smaller than the sub-carrier frequency. In FIG. 3, signal Rx has been shown "smoothed", that is, without showing the ripple of the high-frequency carrier (at 13.56 MHz). In the example of FIG. 3, it has been considered that each of the three shown bits was different from the previous bit. Thus, a code 010 is being transmitted.

Whatever the type of modulation or of back modulation used (for example, of amplitude, phase, frequency) and whatever the type of data coding (NRZ, NRZI, Manchester, ASK, BPSK, etc.), the modulation is performed digitally, by shift between two binary levels.

As illustrated in FIG. 3, signal $V_T$ is formed of a pulse train at the sub-carrier frequency, a phase shift occurring for each state switching from one bit to the next bit.

If several transponders are present in the field of a same terminal, different communications may be initiated between each transponder and the read/write terminal. Most often, the transponders transmit identifiers which enable the terminal to individualize messages respectively intended for them.

In the transponder-to-terminal direction, the transponders determine whether messages are respectively intended for them based on their identifier contained in the message, that they detect after demodulation.

However, a problem may arise when several transponders simultaneously transmit to a same terminal, while they are in the field of this terminal. Such conflicts may be wrongly detected by the read/write terminal, which adversely affects the system reliability.

Further, in some applications, it may be desired for transponders to exchange information. In such a case, the terminal is used as an intermediary for this communication by receiving the information from one transponder to transmit it back to another one, having previously demodulated, then remodulated it.

BRIEF SUMMARY OF THE INVENTION

An embodiment of the present invention provides a novel solution of information exchange between two transponders in the field of a read/write terminal.

An embodiment of the present invention also provides a solution which requires no modification of existing read/write terminals.

An embodiment of the present invention also provides a solution which enables solving problems of conflicts when two transponders are present in the field of a read/write terminal with which they communicate.

One embodiment of the present invention provides an electromagnetic transponder intended to draw the power necessary to its operation from a field radiated by a terminal of transmission of a carrier at a first remote supply frequency, and to back-modulate the received signal at the rate of a sub-carrier at a second frequency lower than the first one, and comprising means capable of demodulating and decoding signals modulated by said sub-carrier.

According to an embodiment of the present invention, the transponder comprises an oscillating circuit upstream of a rectifying means capable of providing a D.C. supply voltage of an electronic circuit, the electronic circuit comprising means for transmitting digitally-coded information, and the transponder comprising a demodulator capable of differentiating information received at the rate of the back-modulation sub-carrier of another transponder with respect to information received, at the rate of a third still lower frequency, from the read/write terminal.

According to an embodiment of the present invention, said demodulator comprises two parallel branches, each having a filter respectively centered on the second and third frequencies, each filter being associated with a digital decoder.

According to an embodiment of the present invention, a first decoder associated with the filter centered on the back-modulation frequency is a decoder of phase shift type, a second decoder associated with the third frequency being a decoder of amplitude shift type.

One embodiment of the present invention also provides a system of contactless and wireless communication between at least two electromagnetic transponders having no independent power supply, each transponder comprising means capable of drawing the power necessary to the supply of its circuits from an electromagnetic field at a first remote supply frequency radiated by at last one read/write terminal, and means for demodulating and decoding signals transmitted by another transponder in modulation of a sub-carrier at a second frequency.

According to an embodiment of the present invention, each transponder comprises separate demodulators and decoders respectively dedicated to the reception of signals transmitted by another transponder and to the reception of signals transmitted by the read/write terminal.

According to an embodiment of the present invention, the first frequency is 13.56 MHz, the second frequency being 847.5 kHz, and the third frequency being 106.5 kHz.

The foregoing features of the present invention will be discussed in detail in the following non-limiting description of specific embodiments in connection with the accompanying drawings.

DETAILED DESCRIPTION

Figure 1:
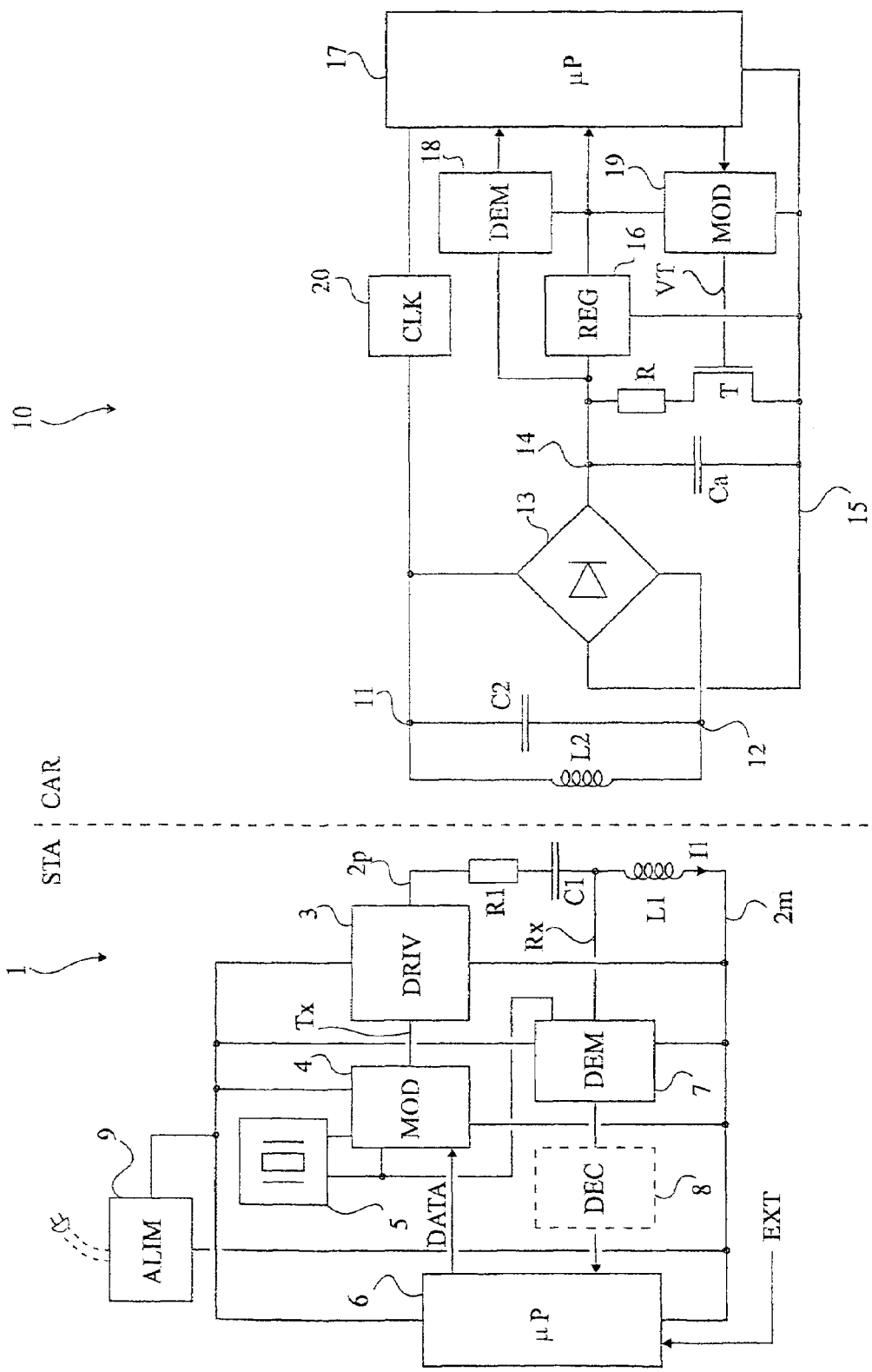
FIGS. 1 to 3, previously described, are intended to show the state of the art and the problem to solve.
Figure 2:
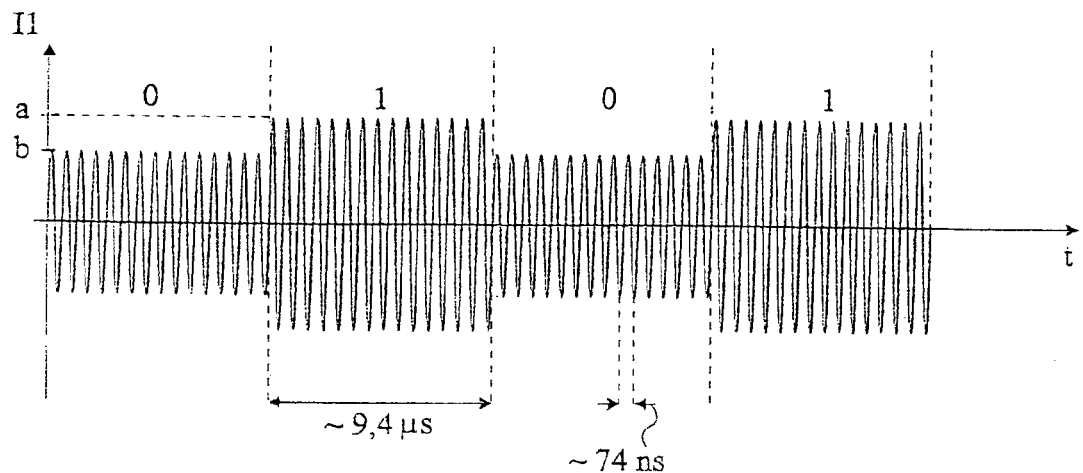
Figure 3:
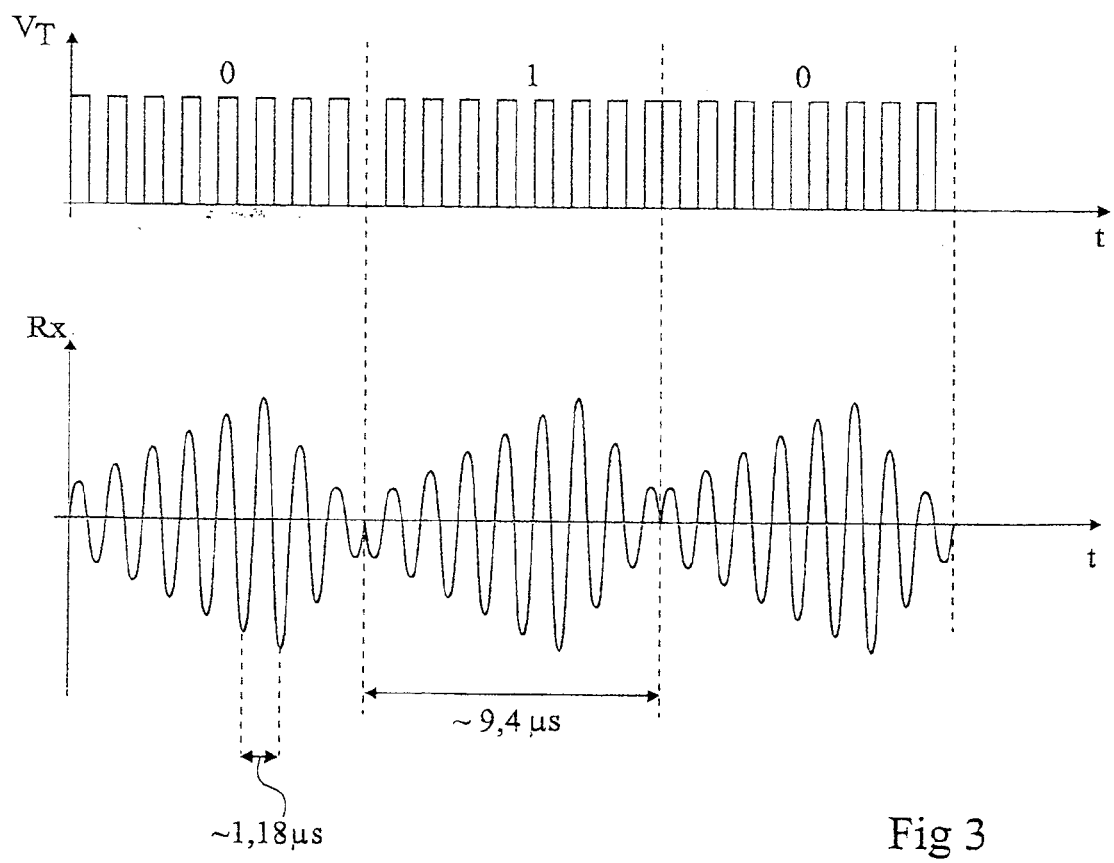

Embodiments for communication between electromagnetic transponders are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Same elements have been designated with same reference numerals in the different drawings. For clarity, only those elements that are necessary to the understanding of the present invention have been shown in the drawings and will be described hereafter. In particular, the structure and the coding of the messages according to different protocols have not been detailed and are no object of the present invention.

A feature of one embodiment of the present invention is to provide a direct communication between two electromagnetic transponders present in the field of a read/write terminal from which they draw their power supply.

Figure 4:
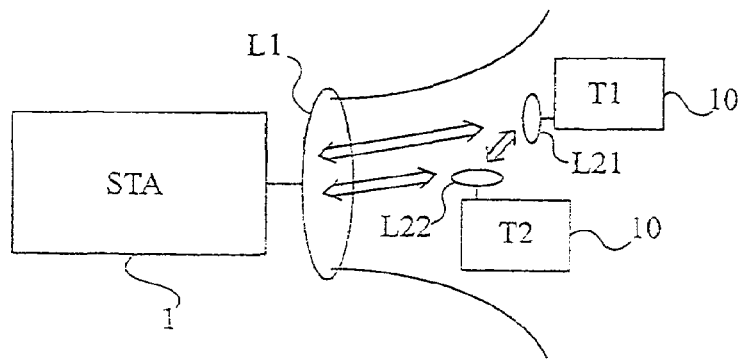
FIG. 4 very schematically shows a system of communication between transponders according to an embodiment of the present invention.

FIG. 4 very schematically illustrates in the form of blocks an embodiment of a communication system according to the present invention.

As previously, a reader 1 (STA) generates via an inductance antenna L1 an electromagnetic field at a frequency corresponding to a carrier of remote supply of transponders 10 (T1, T2). Each transponder is itself comprised of an antenna (inductances L21, L22) used to intercept the electromagnetic radiation of the terminal to draw a supply of its internal circuits therefrom.

Transponders 10 are, according to an embodiment of the present invention, capable not only of communicating with terminal 1, but also directly together as illustrated by the bidirectional arrows of FIG. 4.

When two transponders are in the field of a same terminal and one of the transponders transmits information in back modulation, this influences the electromagnetic field available for the other transponder. Said other transponder can thus detect the transmitted information, provided to be capable of demodulating it or decoding it.

According to a first embodiment of the present invention, the same demodulator is used to receive the information coming from the terminal (for example, at a 106-kHz frequency) and the information coming from another transponder in back modulation (for example, at a 847.5-kHz frequency). In this case, several decoders are provided downstream of the transponder's demodulator according to the type of information to be detected. These decoders then differentiate 106-kilobit transmissions from transmissions at the 847.5 kHz frequency.

Figure 5:
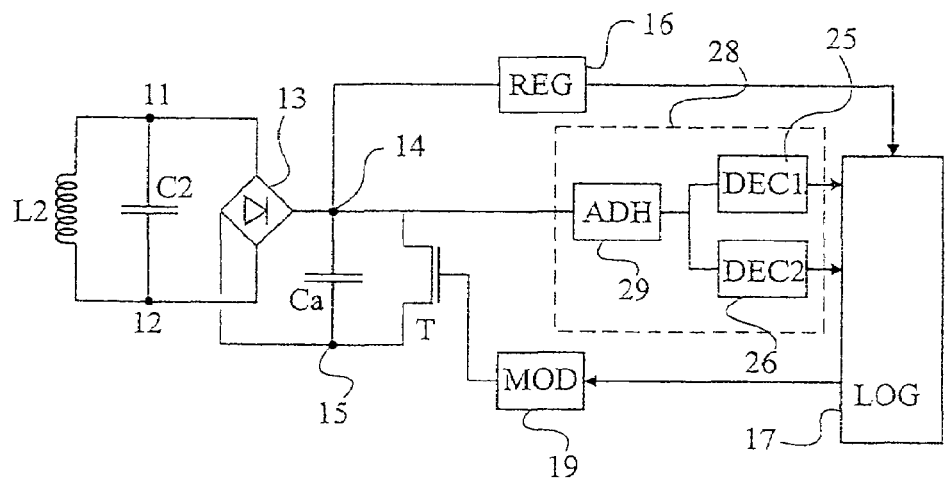
FIG. 5 shows a first embodiment of an electromagnetic transponder according to the present invention.

FIG. 5 very schematically shows in the form of blocks a transponder according to the first embodiment of the present invention.

It shows the resonant circuit formed of inductance L2 in parallel with a capacitor C2 between input terminals 11 and 12 of a rectifying bridge 13 (here, fullwave). Rectified output terminals 14 and 15 of bridge 13 provide the supply voltage across a storage and smoothing capacitor Ca. Supply regulator 16 of the different transponder circuits and especially of demodulator 28, of modulator 19, and of logic control circuits 17 which are formed, either of a microprocessor or of a circuit in wired logic, is also shown. FIG. 5 illustrates an alternative back-modulation circuit in which back-modulation transistor T alone is placed in parallel on capacitor Ca, its on-state series resistance forming its back-modulation resistance.

For simplification, not all components have been shown in FIG. 5. In particular, the clock is of course, if necessary, present. Similarly, the different supply connections of the circuits have not all been shown.

According to an embodiment of the present invention, the output 14 is sent onto two decoders 25 and 26 (DEC1 and DEC2) intended to each decode one of the types of signals likely to be received, that is, those received at the 106-kilobit-per-second rate from a terminal 1 and those received at the 847.5-kHz rate from another transponder.

Demodulator 28 specific to the present invention comprises an analog head 29 (ADH) providing the envelope of the received signal and carried by the 13.56-MHz frequency. This envelope is modulated either at the rate of the 847.5-kilohertz back-modulation carrier, or at the terminal transmission rate (106 kHz). Therefore, each decoder DEC1 or DEC2 is capable of detecting the level variations according to whether they are at the 106-kHz rate or at the 847.5-kHz rate. The respective decoder outputs provide the demodulated signals respectively originating from the terminal or from another transponder in the field and in close coupling with the involved transponder.

Figure 6:
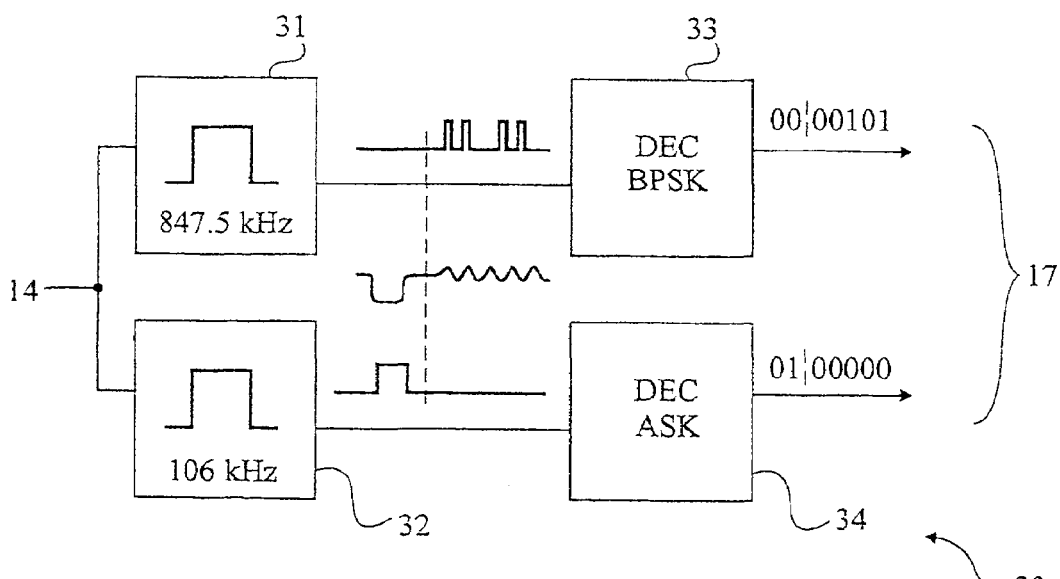
FIG. 6 shows a second embodiment of the transponder according to the present invention.

FIG. 6 shows a second embodiment of a decoder 30 according to the present invention.

According to this embodiment, output 14 of the rectifying bridge is connected to the respective inputs of two filters 31 and 32 respectively centered on the 847.5 and 106 kHz frequencies, for example, corresponding to the back-modulation and modulation frequencies of the terminal. The respective outputs of filters 31 and 32 thus give back demodulated digital signals only if the received signal comprises information at the corresponding frequency. Filter 31 is followed by a decoder 33 of BPSK type, the output of which provides a bit train for circuit 17. Filter 32 is associated with an ASK-type decoder 34, the output of which provides a decoded bit train to circuit 17.

The embodiment of FIG. 6 takes advantage from the fact that, in electromagnetic transponder transmission systems, the transmission from the reader to a transponder is generally performed by an ASK modulation (amplitude shift) at a 106-kHz frequency while the transmission from a transponder to a reader (or for the present invention to another transponder) is performed by a phase shift keying (BPSK) with a modulation frequency of 847 kHz. The modulation types on the side of the transponder intended to decode the two types of signals can thus be distinguished.

It should of course be noted that, in both cases, the 13.56-MHz carrier is modulated by the reader-to-transponder and transponder-to-reader modulation.

An advantage of the present invention is that it requires no modification of the transponders as concerns the modulation part. The present invention only requires a modification of the demodulation part of the transponders to be capable of interpreting information from another transponder in the field of a terminal, sufficiently close for a mutual coupling between two transponders.

Another advantage of the present invention is that by enabling direct communication between two transponders, the problems of possible conflict when several transponders are present in the field of a same terminal can be solved. Indeed, from the moment when a transponder directly intercepts an information coming from another transponder due to the present invention, a prohibition to transmit at the same time may be provided for said transponder so that the time management of the transponder communications towards a same terminal is directly performed by the transponders.

Of course, the present invention is likely to have various alterations, modifications, and improvements which will readily occur to those skilled in the art. In particular, the practical forming of a demodulator to implement the present invention is within the abilities of those skilled in the art based on the functional indications given hereabove and according to the desired coupling range between two neighboring transponders.

It should be noted that in a simplified embodiment, it is possible by means of a same demodulator to differentiate the messages by analyzing the transmitted code. However, such an embodiment is reserved to the case of transponders having a large microprocessor for the computation and storage of the transmitted bits. Indeed, to be able to differentiate by analysis of the received code, it must be possible to memorize a sufficient code length and have a high-performance computation tool. The advantage of one embodiment of the present invention comprising filtering by means of two distinct analog heads of the demodulator avoids such additional computation and storage elements and makes the embodiment applicable in transponders using wired logic circuits to interpret transmissions.

Among the applications of embodiments of the present invention, contactless smart cards (for example, access control identification cards, electronic purse cards, cards for storing information about the card holder, consumer fidelity cards, toll television cards, etc.) and read or read and/or write systems for these cards (for example, access control terminals or portals, automatic vending machines, computer terminals, telephone terminals, satellite televisions sets or decoders, etc.) should more specifically be mentioned. In this type of application, an embodiment of the present invention can enable, for example, refill of a transport pass from an electronic purse card by coupling the two cards in a same field (the reader being then only used to generate a magnetic field for supplying the cards). The corresponding security devices can then remain in the cards, which improves the reliability of systems against piracies. The direct communication between two cards may further enable detection of a communication priority when said cards are in the field of a same terminal.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An electromagnetic transponder intended to draw power for its operation from a field radiated by a terminal of transmission of a carrier at a first frequency, and to back-modulate a received signal at a rate of a sub-carrier at a second frequency lower than the first one, the transponder comprising:
    means for demodulating signals transmitted by another transponder and modulated by said sub-carrier and means for decoding said signals;
    an oscillating circuit upstream of a rectifying means capable of providing a D.C. supply voltage to an electronic circuit, the electronic circuit having means for transmitting digitally-coded information; and
    a demodulator capable of differentiating information received at a rate of said sub-carrier which is a back-modulation sub-carrier of said another transponder with respect to information received, at a rate of a third still lower frequency, from the terminal.

2. The transponder of claim 1 wherein said demodulator comprises two parallel branches, each having a filter respectively centered on the second and third frequencies, each filter being associated with a digital decoder.

3. The transponder of claim 2 wherein a first decoder associated with the filter centered on the back-modulation frequency is a decoder of phase shift type, a second decoder associated with the third frequency being a decoder of amplitude shift type.

4. A transponder, comprising:
    a first circuit to receive a first signal having a first frequency and to provide power from the first signal;
    a second circuit coupled to the first circuit to receive a second signal having a second frequency;
    a third circuit coupled to the first circuit and coupled parallel to the second circuit to receive a third signal having a third frequency, the third signal being received from another transponder;
    an analog unit coupled to the second and third circuits to respectively provide the second and third signals to be demodulated by either the second or third circuits, wherein the second circuit includes a decoder to detect the second frequency of and to demodulate the second signal provided by the analog unit, and wherein the third circuit includes a decoder to detect the third frequency of and to demodulate the third signal provided by the analog unit; and
    a fourth circuit coupled to the second and third circuits to respectively process the demodulated second and third signals.

5. The transponder of claim 4 wherein the first circuit includes:
    a first capacitor and inductor connected in parallel;
    a rectifier circuit having input terminals coupled to the parallel connection of the capacitor and inductor;
    a second capacitor coupled to output terminals of the rectifier circuit; and
    a voltage regulator coupled to the second capacitor and to the rectifier circuit.

6. The transponder of claim 4, further comprising a fifth circuit coupled to the first circuit to transmit a fourth signal.

7. The transponder of claim 6 wherein the fifth circuit includes a modulator having an output coupled to a transistor.

8. A transponder, comprising:
    a first circuit to receive a first signal having a first frequency and to provide power from the first signal;
    a second circuit coupled to the first circuit to receive a second signal having a second frequency;
    a third circuit coupled to the first circuit and coupled parallel to the second circuit to receive a third signal having a third frequency, the third signal being received from another transponder, wherein the second circuit includes:
    a first filter centered at the second frequency to filter the second signal; and
    a first decoder coupled to the first filter to demodulate the filtered second signal, and wherein the third circuit includes:
    a second filter centered at the third frequency to filter the third signal; and
    a second decoder coupled to the second filter to demodulate the filtered third signal, the transponder further including:
    a fourth circuit coupled to the second and third circuits to respectively process the demodulated second and third signals.

9. The transponder of claim 8 wherein the first decoder comprises a phase shift-type decoder, and wherein the second decoder comprises an amplitude shift-type decoder.

10. The transponder of claim 8 wherein the first frequency is higher than the second frequency, and wherein the second frequency is higher than the third frequency.

11. A method for a transponder, the method comprising:
- at said transponder, receiving a first signal having a first frequency and providing power from the first signal;
- at said transponder, receiving a second signal having a second frequency and demodulating the received second signal;
- at said transponder, receiving a third signal having a third frequency from another transponder and distinguishing the received third signal from the second signal and demodulating the received third signal; and
- at said transponder, processing the demodulated second or third signals,
- wherein distinguishing the received third signal from the second signal includes detecting whether a received signal is the third signal or the second signal based on the frequency of the received signal by using parallel decoders, one of which decodes based on the second frequency and the other one of which decodes based on the third frequency.

12. A system for a transponder, the system comprising:
- means in said transponder for receiving a first signal having a first frequency and for providing power from the first signal;
- means in said transponder for receiving a second signal having a second frequency and for demodulating the received second signal;
- means in said transponder for receiving a third signal having a third frequency from another transponder and for distinguishing the received third signal from the second signal and for demodulating the received third signal;
- means in said transponder for processing the demodulated second or third signals; and
- terminal means for supplying said first signal to said transponder to power said transponder and further for supplying said first signal to said another transponder to power said another transponder, said transponder and said another transponder being in a same electromagnetic field of said terminal means as provided by said first signal.

13. The system of claim 12 wherein the means for demodulating the second and third signals include means in parallel for decoding the second and third signals separately.

* * * * *